(12) United States Patent
Lesartre et al.

(10) Patent No.: US 8,225,048 B2
(45) Date of Patent: Jul. 17, 2012

(54) SYSTEMS AND METHODS FOR RESOURCE ACCESS

(75) Inventors: Gregg B. Lesartre, Fort Collins, CO (US); Craig Warner, Aspen Court, TX (US); John Wastlick, Allen, TX (US); Harvey Ray, Frederick, CO (US); John W. Bockhaus, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 600 days.

(21) Appl. No.: 12/432,348

(22) Filed: Apr. 29, 2009

(65) Prior Publication Data

US 2010/0082912 A1    Apr. 1, 2010

Related U.S. Application Data

(60) Provisional application No. 61/101,979, filed on Oct. 1, 2008.

(51) Int. Cl.
*G06F 12/00* (2006.01)
(52) U.S. Cl. .......... 711/141; 711/150; 711/151
(58) Field of Classification Search .......... 711/147, 711/145, 151, 141, 150
See application file for complete search history.

(56) References Cited

U.S. PATENT DOCUMENTS 6,654,860 B1 * 11/2003 Strongin et al. .......... 711/154
2006/0123206 A1 * 6/2006 Barrett et al. .......... 711/158

* cited by examiner

*Primary Examiner* — VanThu Nguyen
*Assistant Examiner* — Hien Nguyen

(57) ABSTRACT

Systems and methods are provided to manage access to computing resources. More specifically, certain embodiments are described in which a resource or resource consumer can engage access controls or request that access controls be engaged if the age of a request exceeds one or more thresholds. For example, a requester may, after the age of a request meets or exceeds a threshold, indicate to a destination that a control should be engaged.

20 Claims, 9 Drawing Sheets

SYSTEMS AND METHODS FOR RESOURCE ACCESS

This application claims the benefit of the U.S. Provisional Application having the Ser. No. 61/101,979, filed Oct. 1, 2008, having the title "Systems And Methods For Resource Access", which is hereby incorporated by reference in its entirety.

BACKGROUND OF THE INVENTION

The current application relates to access control schemes for computing-related resources. In particular, the application discloses systems and methods for introducing access control schemes in particular computing systems according to various criteria, for example, where there is competition for a resource such as memory among a variety of components attempting to access that memory.

DESCRIPTION OF EMBODIMENTS

Figure 1:
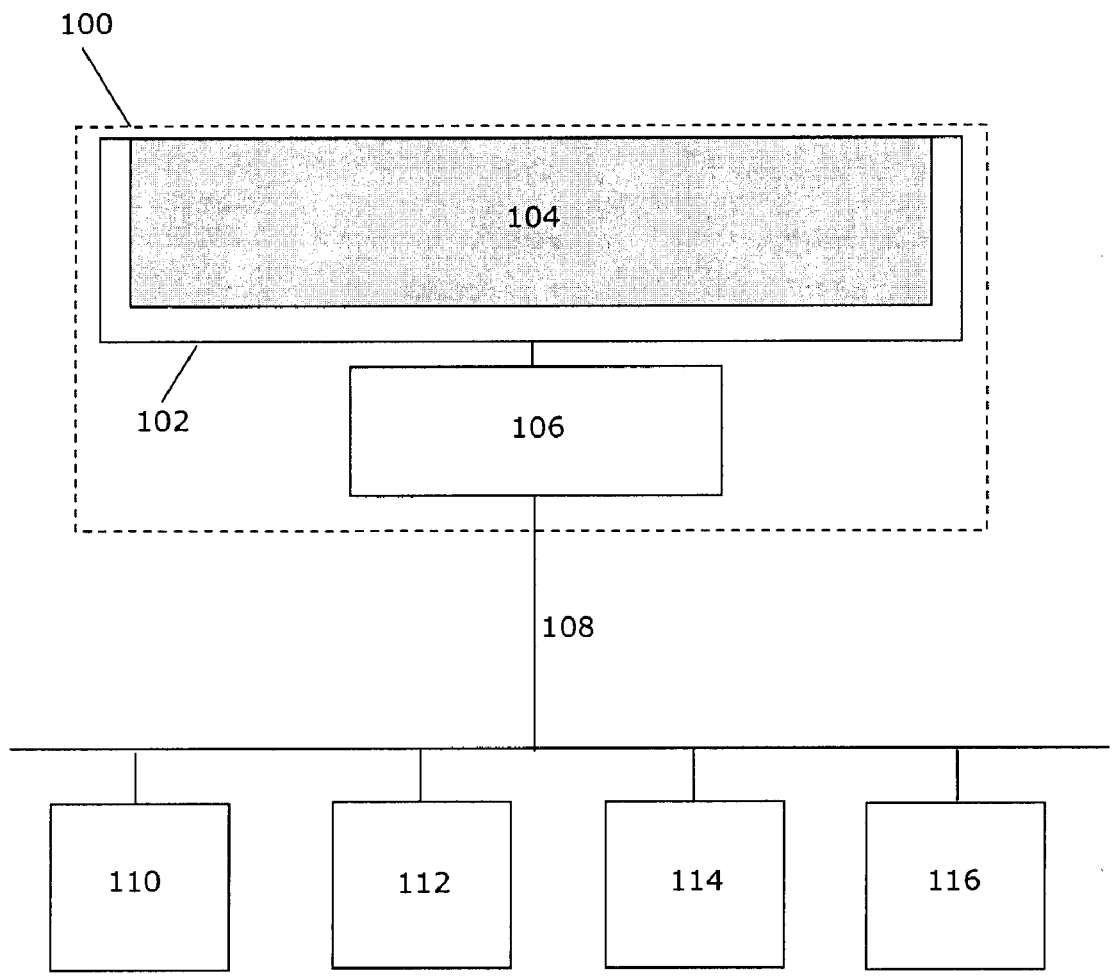
FIG. 1 is an illustration of a resource system in which embodiments may be employed.

Various embodiments of the invention will be described hereinafter with reference to the figures. In the figures, like reference numerals denote like elements.

FIG. 1 shows a system in which embodiments can be used. The system comprises a resource 100, shown by a dashed line, which is itself a system. The system may be a computer system, a computer board such as a circuit board comprising computer chips, one or more computer chips in communication, or subsystems on a single chip. Resource 100 can for example be a memory chip or more specifically a cache chip, or a cache subsystem on a chip. Resource 100 comprises a memory portion 102 with a cell array 104 and control circuitry 106.

The system of FIG. 1 connects resource 100 to resource consumers 110, 112, 114 and 116, which are themselves systems. Resource consumers 110 through 116 can be a variety of components, including microprocessors, microcontrollers, cache components, persistent storage components, peripheral components, communication interfaces, or other components. These may be referred to more generically as client nodes, which also includes their use in a network.

Resource consumers 110 through 116 are connected to communication medium 108, which can be an electronic communication medium such as a network or bus. In the example where resource 100 is a memory cache, medium 108 is optionally a parallel bus.

Resource consumers 110 through 116 operate in part by gaining access to resource 100. Access can mean any of a variety of things depending on the resource involved. If the resource 100 is a type of memory, access can mean, for example, performing a read operation in the memory or performing a write operation. Such operations are often referred to as "transactions", and represent the operations of which the resource is capable.

One method of gaining access to resource 100 is to transmit a request over communication medium 108. A request in the present application means information indicating that the resource consumer needs to perform a transaction on the resource 100. A request can be, for example, a collection of digital bits transmitted serially or in parallel over communication medium, comprising data indicating the desired resource (if more than one is possible) the desired transaction type (if more than one is possible), an identifier of the resource consumer sending the requested ("the requester"), and any data necessary to perform the transaction. Of course, a request can be transmitted in a number of different ways, for example, in multiple data packets, or over various different communication media such as synchronized registers or semaphoric memory access.

Figure 2:
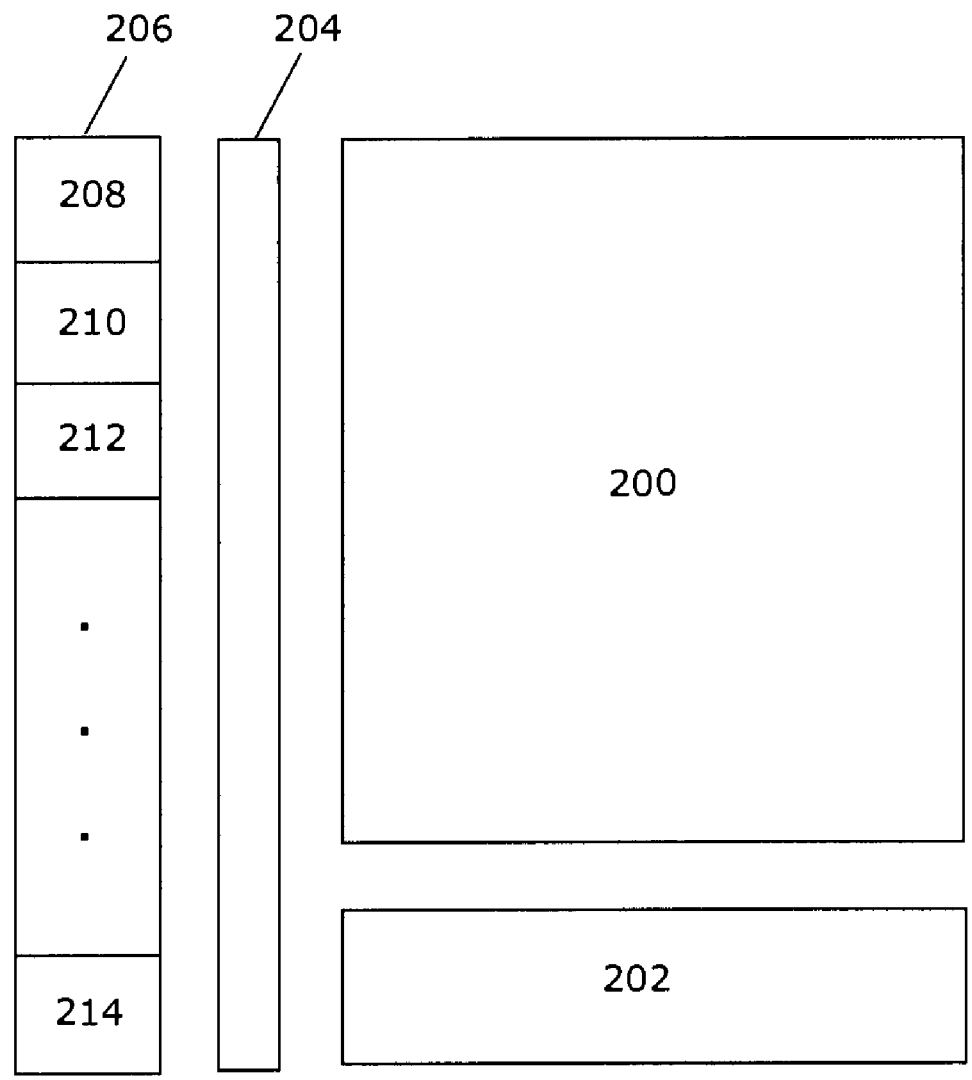
FIG. 2 is an illustration of control logic for a resource embodiment.

FIG. 2 shows an example subdivision of control circuitry 106 of FIG. 1. The subdivision comprises resource control circuitry 200, which is used to control the performance of transactions in resource 100. The subdivision further comprises a communication interface 202, which can comprise, for example, bus controller circuitry. The subdivision further comprises a memory element 206 and control circuitry 204 for memory element 206. In the present application, the use of circuitry can comprise hardware or programmable hardware executing software. These are generically referred to as processing elements. The memory element 206 may be a buffer, which is a physical memory or portion of a physical memory set aside for temporarily storing communications.

Memory 206 is shown in an embodiment as a queue, having queue entries 208, 210, 212 and so forth (as shown by the three dots), until element 214. The size of the memory element should be chosen based on the expected number of requests to service and the expected service time requirements. The memory element 206 need not be implemented as a queue, but can also be, for example, static or dynamic registers, RAM, persistent storage such as a disk drive, or other appropriate media.

In the example embodiment, queue entries 208 through 214 store information pertinent to processing requests, such as the type of transaction requested, the identity of the requester and any data necessary to process the requested transaction. The memory may also store information concerning requesters that have recently had requests rejected, in order to facility operation under an access control scheme. In normal operation, the resource 100 can process requests according to a first-in, first served (FIFS) scheme. For example, when the request stored in element 208 is processed, the requests stored in 210 through 214 are moved up, such that they occupy elements 208 through 212. New requests are then placed in element 214. Alternately, control circuitry 204 or other appropriate circuitry can maintain a pointer to the current element, which can be moved when a request is processed, rotating from the end of the queue to the beginning.

In one example embodiment, the resource comprises two vectors to track the detection of a request from a particular requester, and the servicing of a request from a particular requester. These can be used to implement access control schemes as described herein.

Figure 3:
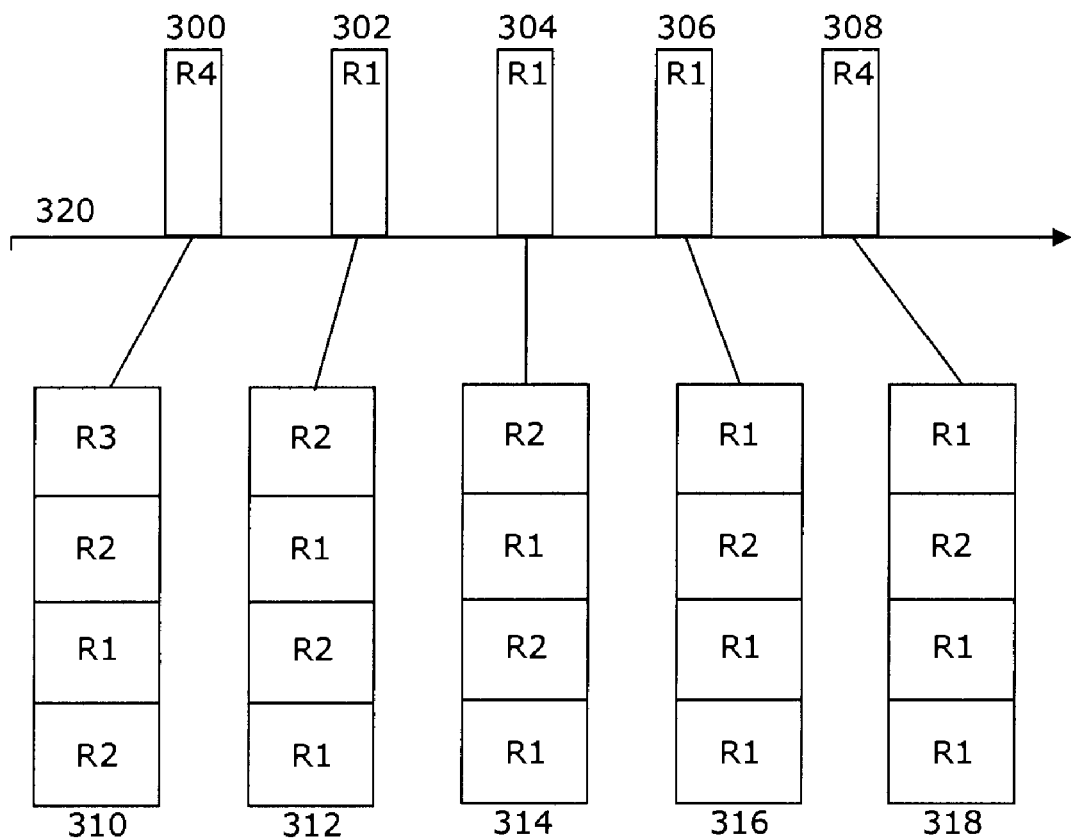
FIG. 3 is an illustration of queue states after the receipt of various resource access requests.

FIG. 3 illustrates an access control problem that can be encountered in certain situations. Axis 320 illustrates the passage of time. Signals 300, 302, 304, 306 and 308 represent the reception of requests from requesters. Requests 300 and 308 are from requester number 4, while requests 302, 304 and 306 were sent by requester number 1. Requester number 1 is operating at a higher clock speed and is able to transmit requests more quickly.

Queue states 310, 312, 314, 316 and 318 represent the state of the same requester queue after the reception of requests 300, 302, 304, 306 and 308. The requester queue in this example stores information relating to four requests. If a request is received when the queue is full, the request is rejected.

At queue state 310, the queue contains requests from requesters 3, 2, 1 and 2, where the request from requester number 3 is the first due to be processed. The resource just received a request from requester number 4, but was not able to accommodate the request in the queue. At queue state 312, the resource has processed a request from requester number 3, and was able to accept the request 302 from requester number 1, which occupies the last space in the queue. At queue state 314, the resource has not had time to process a further request, and thus the request 304 from requester number 1 was rejected. At queue state 316, the resource was able to process the request from requester number 2, and thus had space to accept request 306 from requester number 1.

At queue state 318, the resource has not had time to process an additional request, and thus was not able to accept the resent request 308 from requester number 4. Therefore, because of the speed at which requester number 1 is sending requests, a single request from requester number 4 was not able to be processed.

Figure 4:
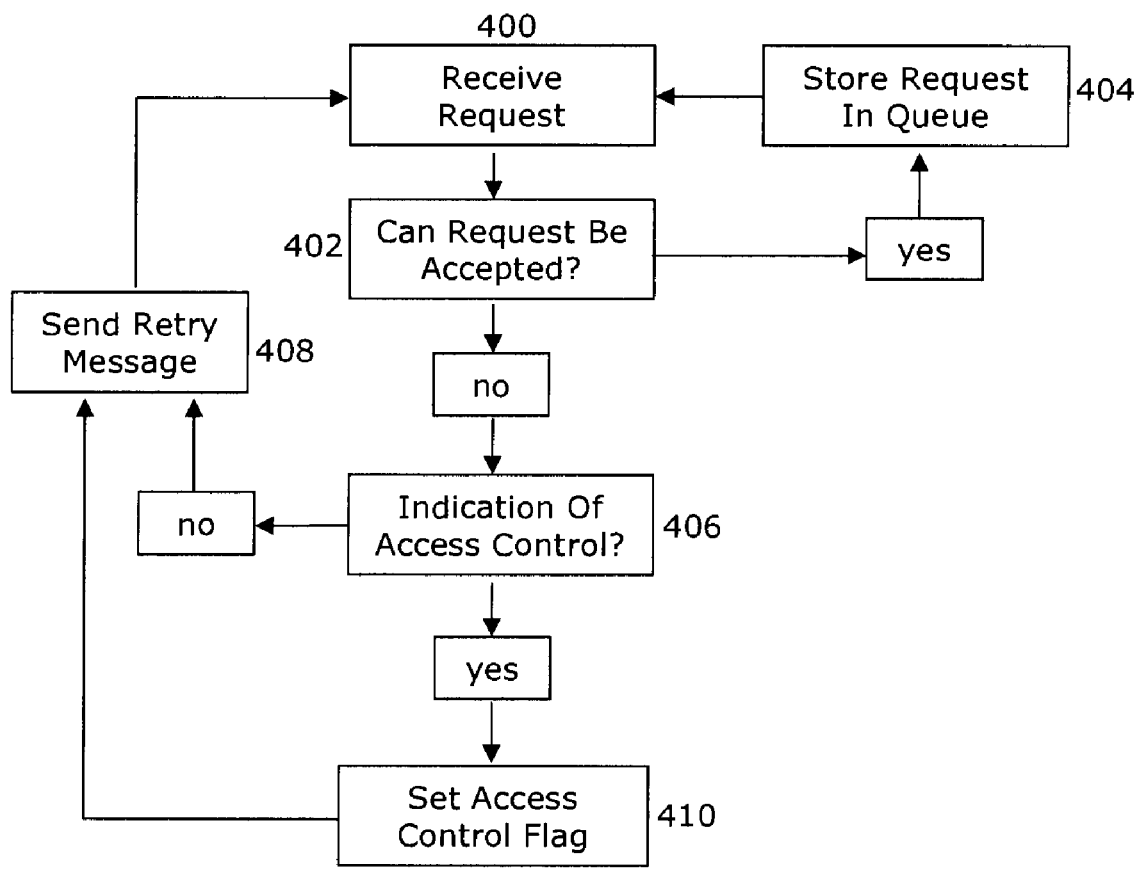
FIG. 4 is a flow chart showing exemplary steps for receiving a request at a resource.

FIG. 4 shows a flow chart of an exemplary embodiment. A resource receives a request at step 400, and checks to determine whether the request can be accepted at step 402. This may be determined, for example, based on the space available in a memory element or address space for the request. If the request can be accepted, the request may be stored as in step 404, and requests may continue to be received at step 400. If the request can not be accepted, the resource checks at step 406 to determine whether there is an indication of an access control, for example, encoded in the request or at a shared memory address. If there is no such indication, a signal that the resource consumer should retry the request is sent at step 408. If such an indication is present, the resource stores that fact at step 410 in a control register or similar mechanism, causing the resource control circuitry to implement an access control scheme.

In the present application, an access control scheme is a way of attempting to ensure that all or a select subset of eligible requesters have an opportunity to access a resource, and is also known as a fair sharing scheme. Such an access control scheme may be, for example, a forward progress screen, which prevents a second request from a requester from being processed before each of a select set of requesters has had the opportunity to have a first request processed.

Figure 5:
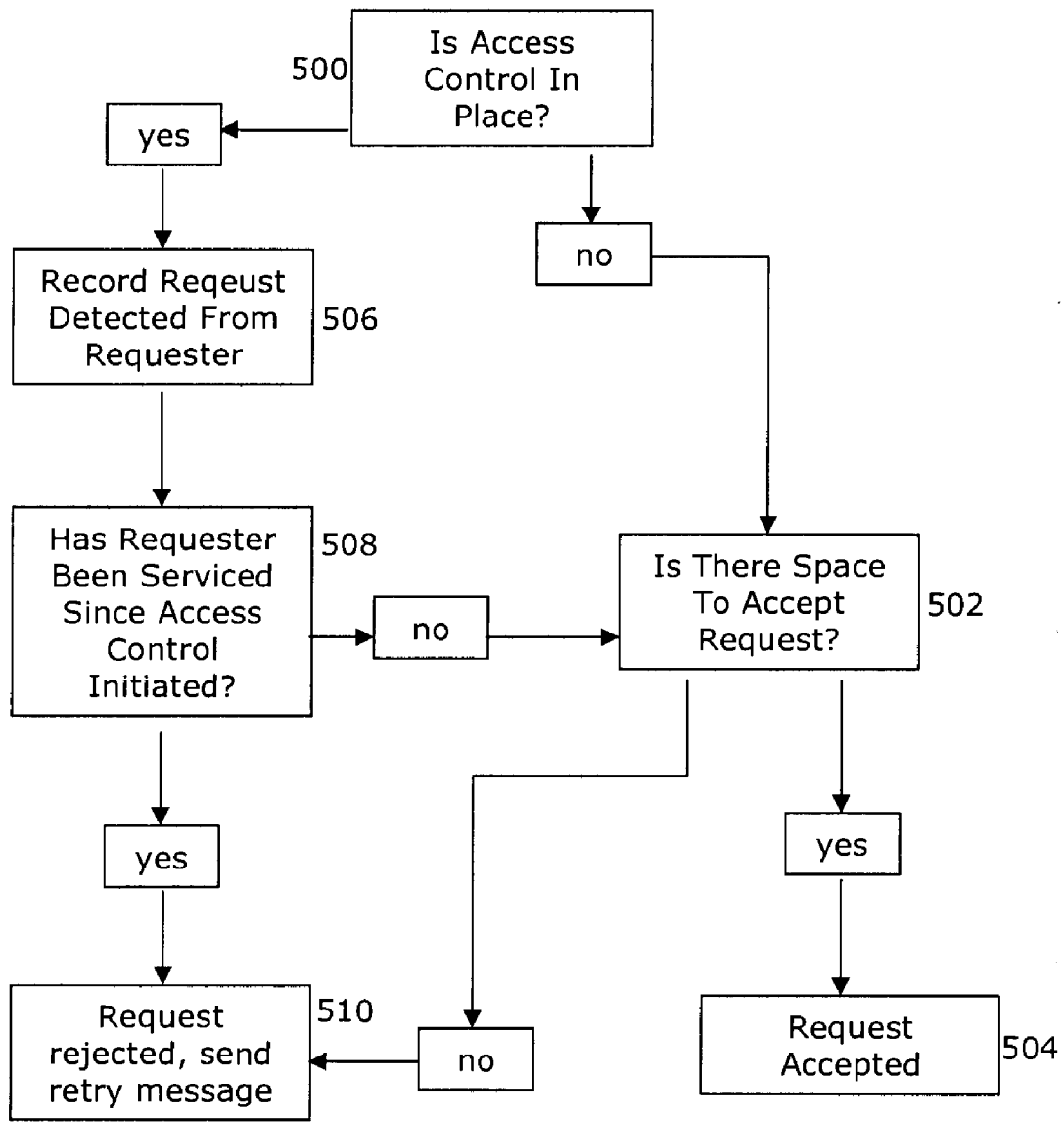
FIG. 5 is a flow chart showing exemplary steps for accepting or rejecting requests at a resource.

FIG. 5 shows an operation of a resource that has the potential to implement an exemplary access control scheme. The steps in FIG. 5 can be carried out, for example, to implement box 402 in FIG. 4, meaning that a resource has already detected an incoming request. At step 500, the resource checks whether it is operating under an access control scheme. If it is not, the resource then checks whether there is space to accept the request at step 502, for example, whether there is space in a queue for storing requests at the resource. If there is space, the request can be accepted at step 504. If there is no space, the request is rejected and a retry message is sent at step 510.

If, however, the resource is operating under and access control scheme, it can first record that a request was detected from the particular requester at step 506. Next, the resource can check whether a request has been serviced from the particular requester since the access control scheme was initiated. If not, the resource again checks to see whether it is possible to accept the request at step 502, and either accepts the request (step 504) or rejects the request and sends a retry message (step 510). If a request has previously been serviced from the particular requester since the access control scheme was initiated, the request is rejected at step 510 and a retry message is sent.

Figure 6:
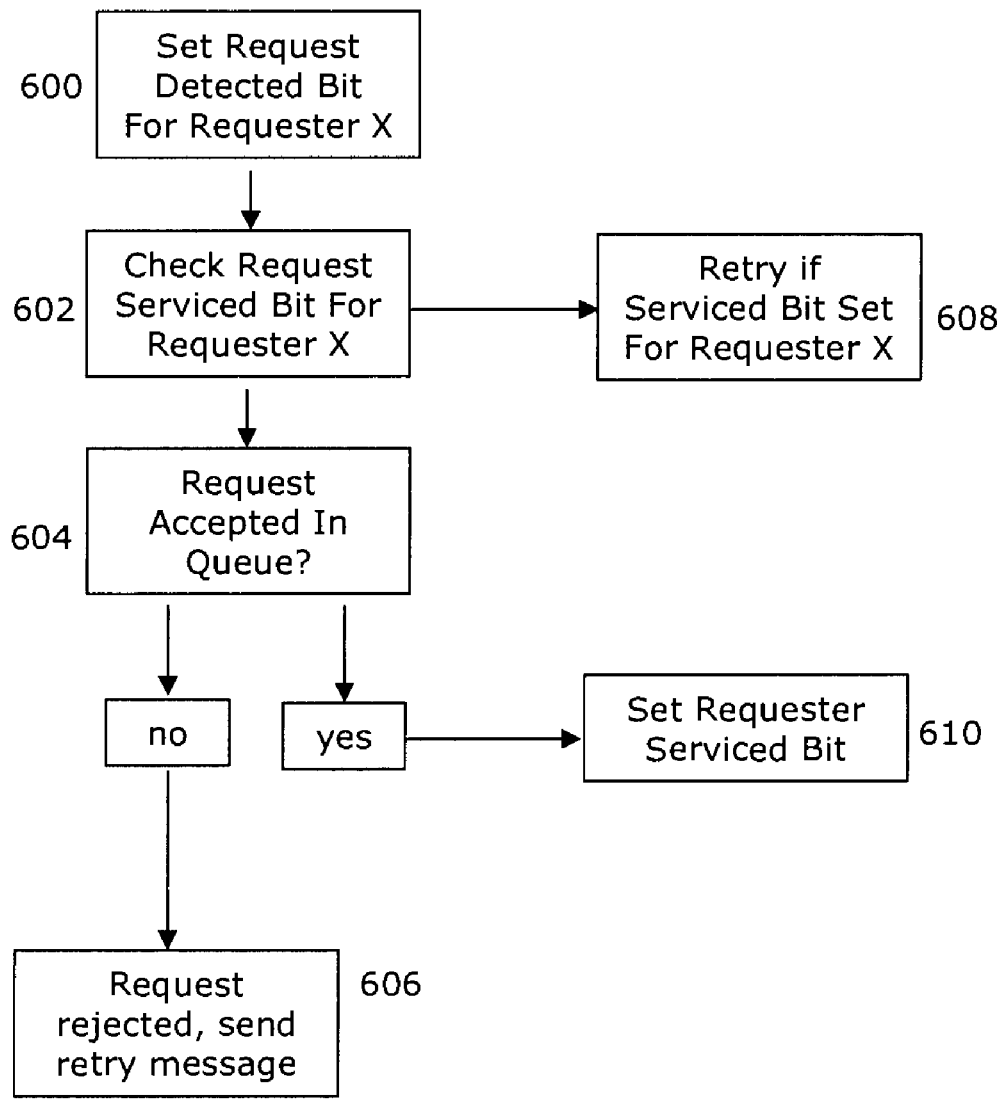
FIG. 6 is a flow chart showing a specific example embodiment for steps in an exemplary access control.

FIG. 6 shows a specific example embodiment for the implementation of an access control scheme. FIG. 6 assumes that a request has been detected, and the resource is operating under an access control scheme. In the embodiment shown in FIG. 6 the resource maintains, for each requester, two bits of information. A first bit ("request detected bit") signifies whether a request has been detected from the particular requester since the access control scheme was initiated. The second bit ("requester serviced bit") records whether a request has been serviced for the particular requester since the access control scheme was initiated.

In step 600, the resource has received a request from requester X, and sets the request detected bit for the particular requester X. In step 602, the resource checks the requester serviced bit for requester X, to determine whether a request has been serviced since the access control was initiated. If the requester serviced bit for requester X is set, the request is rejected and a retry message is sent at step 608. If the requester serviced bit is not set, the resource checks to see whether the request can be accepted into a queue at step 604. If there is no space in the queue, the request is rejected and a retry message is sent. If there is space in the queue, the request is accepted and the requester serviced bit is set, such that new requests from requester X will be rejected until the access control scheme is terminated.

An access control scheme can be terminated under a variety of conditions. For example, an access control scheme can be terminated when all requesters for which a "request detected" bit is set also have the "requester serviced" bit set, or, for example, when a certain number of requests have been serviced from each requester that has actually requested a transaction, or when a request has been serviced from each requester.

Figure 7:
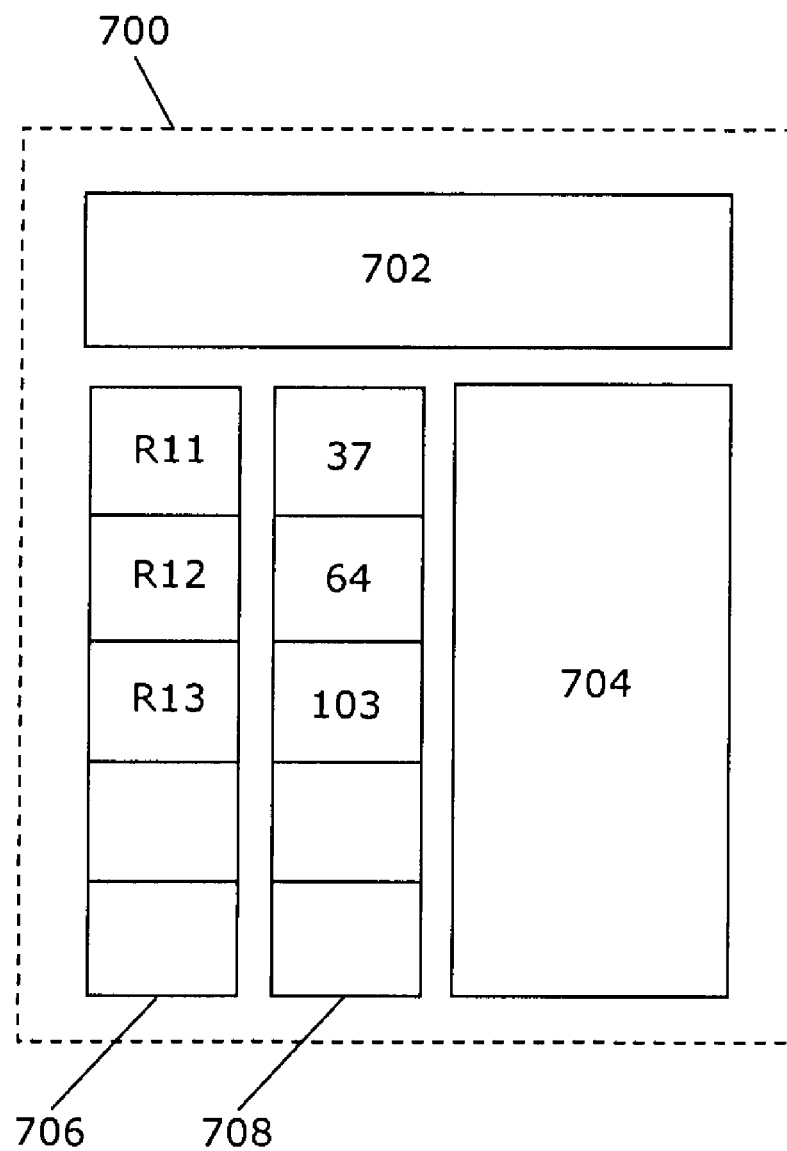
FIG. 7 is an illustration of a request consumer in which embodiments may be used.

FIG. 7 illustrates a requester 700 according to one exemplary embodiment. The requester 700 comprises a communication interface, such as a bus controller, a serial interface or a network interface, for example. Requester 700 also comprises control circuitry 704, as well as memory components 706 and 708. Memory components 706 and 708 may comprise a single memory element, and may be in the form of queues, registers, RAM, etc.

In FIG. 7, information corresponding to requests for access to a resource are stored in memory component 706. In component 706, requests R11, R12 and R13 are stored. Corresponding to each such request, information corresponding to an age the respective request is stored in memory component 708. For example, in FIG. 7, request R11 corresponds to a time of 37, at which point R11 was initiated. An age can also be stored directly, or other information used to compute an age or other appropriate criterion. The memory components 706 and 708, or variations thereof, can be used to track the status of a request, by storing information relating to the age of a request, the number of times a request has been refused, the number of times a request has been sent, or similar information.

Figure 8:
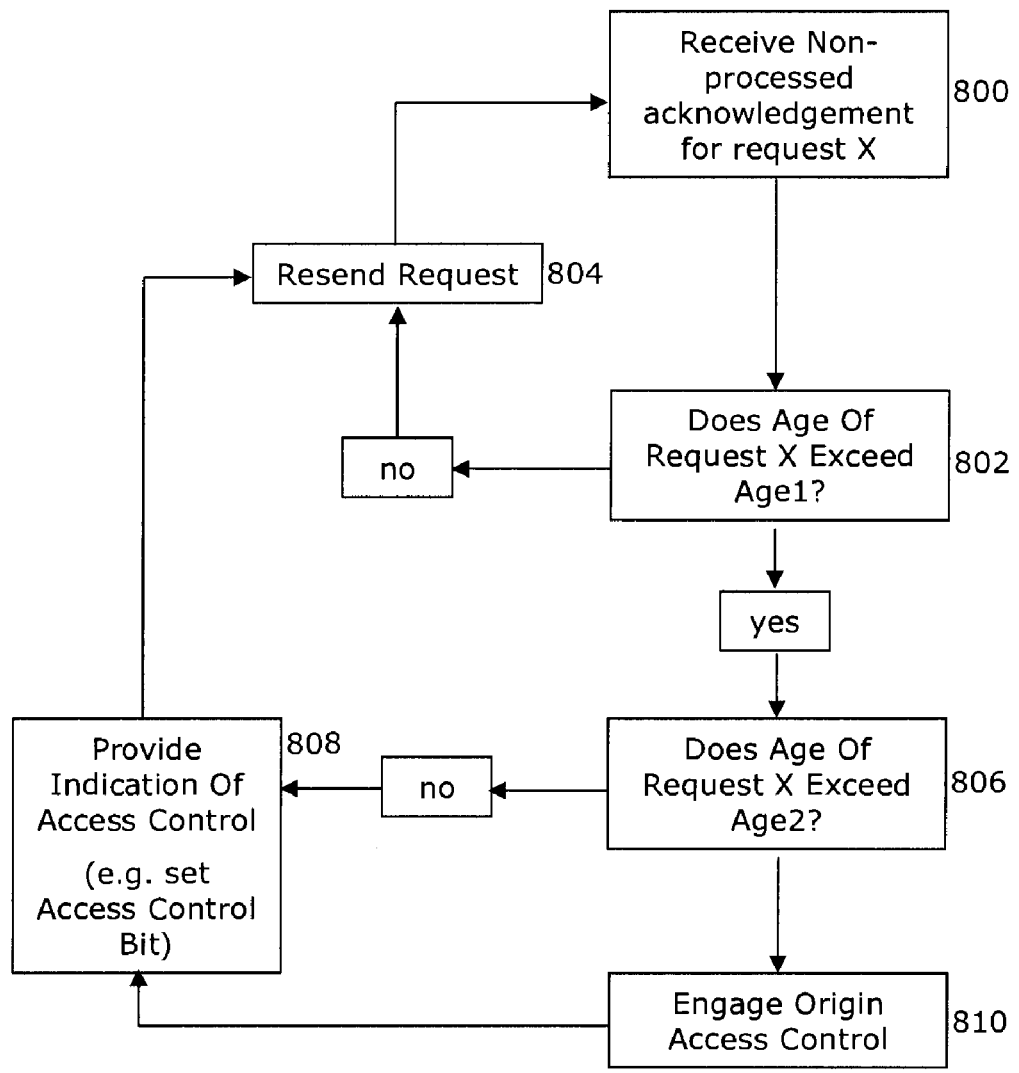
FIG. 8 is a flow chart illustrating steps that can be carried out by a resource consumer in indicating and engaging an access control.

FIG. 8 illustrates an exemplary embodiment of a resource consumer. In this example, request X has already been transmitted to a resource, but has been rejected by the resource. An acknowledgement of the rejection is received at the resource consumer at step 800. At step 802, the resource consumer checks the age of the rejected request and compares the age of the rejected request with a criterion. If the criterion is not met, for example if a threshold age has not been exceeded, the request is resent to the resource at step 804.

If at step 802 it is determined that the criterion is met, the resource consumer checks to determine whether a second criterion is met at step 806, for example, whether a second age threshold has been exceeded. If the second criterion has not been exceeded, then at step 808 an indication of access control is provided. This can be done, for example, by including an access control or forward progress screen bit or bits in a request data packet, by accessing shared memory, by writing to a register, or by any other suitable mechanism accessible to the resource.

If the second criterion is met at step 806, for example if a second age threshold is exceeded, a second access control scheme is initiated at step 810. The second access control mechanism can be, for example, a suspension of the issuance of new requests until the request meeting the second criterion has been processed. The access control scheme can also include, for example, setting a timing limitation on the issuance of new requests, prioritizing requests, or turning only new requests around that contain a particular data marker or originate from a particular subset of sources.

Implementing a second access control scheme based on a criterion such as age has several advantages. In the illustrated embodiment, for example, when the age of a request exceeds a threshold, a forward progress screen is initiated at the resource, under which the resource allows a group of requesters access to the resource a specified number of times. The second access control at the requester itself prevents any single requester from overwhelming its aging requests with new requests. If age-based criteria are used, the access control schemes are not implemented until necessary, and do not affect normal operation with certain statistical boundaries that can be adjusted by adjusting the criteria for establishing first and second access control schemes.

Figure 9:
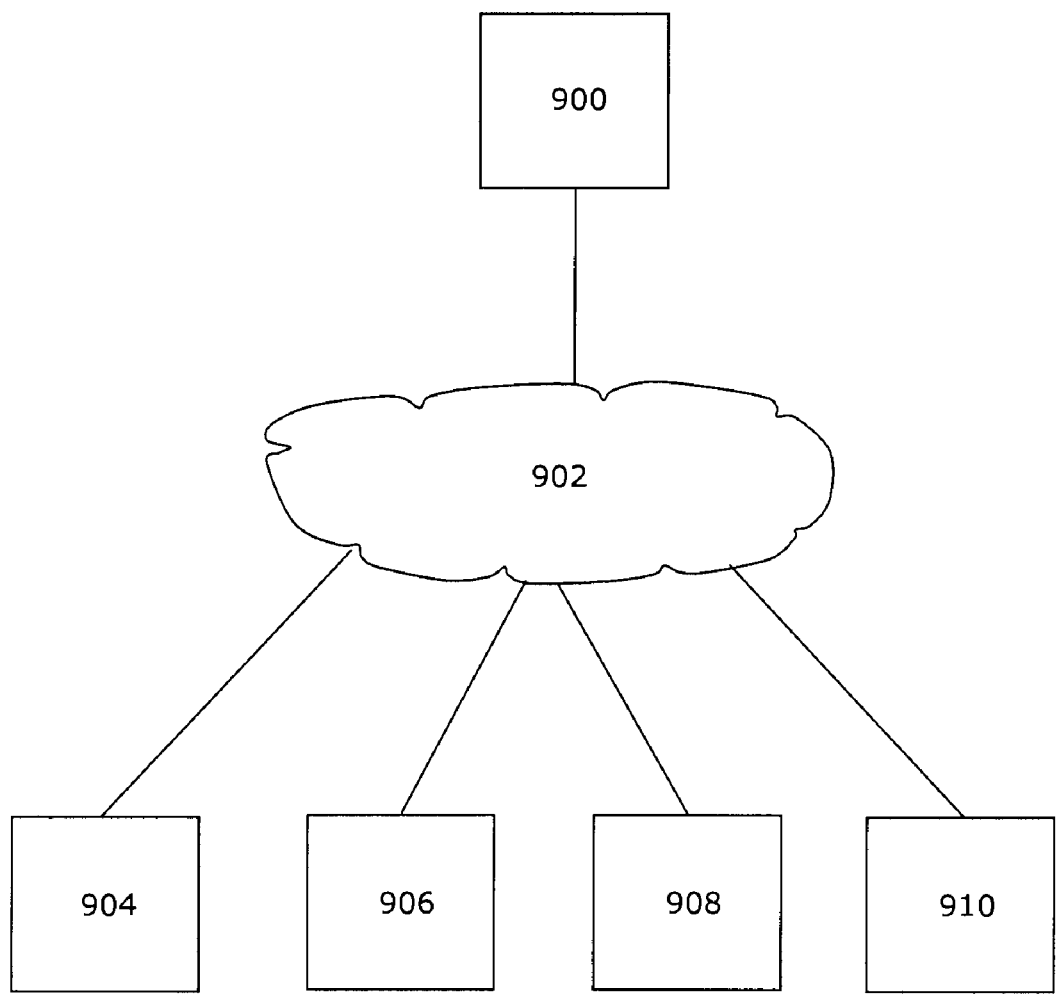
FIG. 9 illustrates a network system in which embodiments may be used.

FIG. 9 shows another type of system in which embodiments of the present application may be used. FIG. 9 illustrates a resource 900, such as a server or network memory facility, accessible over a network 902, which can be a local network, a wide area network, a TCP/IP network such as the Internet, a wireless network, or another type of network. Resource consumers 904, 906, 908 and 910 all share access of resource 900, which can implement an access control scheme in accordance with the embodiments. Furthermore, resource consumers 904, 906, 908 and 910 can track the age of requests and provide an indication that an access control should be engaged to resource 900, and can indicate access controls at the requester if the age of an outstanding request meets a second criterion. In the present application, engaging an access control means setting conditions such that a resource or requester operates under an access control.

Embodiments in this application may be implemented in computer hardware, or computer hardware executing software instructions, and may be embedded in a computer readable medium such as a memory or persistent storage medium.

Use of the terms "first", "second", etc. in the claims is intended to distinguish similar terms from another, and is not meant to indicate structure or order.

What is claimed is:

1. A method for sharing access to a resource among a plurality of requesters, comprising:
    electronically receiving a first request for access to a resource;
    checking whether the first request comprises an indication that an access control should be engaged; and
    if an indication that an access control should be engaged is associated with the first request, engaging an access control scheme.

2. The method of claim 1, further comprising:
    determining whether an age of the first request exceeds a threshold; and
    if the age exceeds the threshold, providing the first request with an indication that an access control should be engaged.

3. The method of claim 2, further comprising:
    determining whether the age exceeds a second threshold; and
    if the age exceeds a second threshold, engaging a second access control.

4. The method of claim 3, wherein engaging the second access control comprises:
    holding pending requests until the first request is processed.

5. The method of claim 2, wherein providing the first request with an indication that an access control should be engaged comprises:
    setting an access control bit in the first request.

6. The method of claim 5, wherein engaging the access control scheme comprises:
    accepting requests only from requesters that have not been serviced since the access control scheme was initiated.

7. A system, comprising:
    a resource comprising memory capable of storing data corresponding to at least two requests; and
    circuitry configured to detect the presence of a forward progress screen datum in at least one of the at least two requests and, after detecting said datum, to process a number of requests selected on the basis of a requester identification from the at least two requests.

8. The system of claim 7, wherein the system is a multiprocessor computing system.

9. The system of claim 7, wherein the system is a computer board.

10. The system of claim 7, further comprising:
    a requester device comprising memory capable of storing data corresponding to at least two requests, and wherein the requester device is configured to store data corresponding to an age of at least one particular request.

11. The system of claim 10, wherein:
    the requester device further comprises circuitry configured to determine whether the age of the at least one particular request has exceeded a memory value and, if so, to alter the particular request.

12. The system of claim 11, wherein:
    the particular request is configured to be altered by changing the value of a data bit in a digital request format.

13. The system of claim 11, wherein:
    the circuitry configured to determine whether the age of the at least one particular request has exceeded a memory value is further configured to determine whether the age of the particular request has exceeded a second memory value, and if so, to halt transmission of requests to the resource.

14. The system of claim 7, wherein the resource is a memory.

15. A transaction request provider, comprising:
a buffer for storing data relating to transactions for processing, the buffer comprising storage for time-related information;
a communications interface for allowing transmission of data to a transaction processing component;
a processing element for tracking the status of at least one transaction;
wherein the processing element is configured to compare the time-related information corresponding to the at least one transaction with a predetermined criterion to decide whether to transmit a request that the transaction processing component initiate transaction processing according to a fair sharing scheme.

16. The transaction request provider of claim 15, wherein the transaction request provider is a microprocessor.

17. The transaction request provider of claim 15, wherein the transaction request provider is a client node, and the communications interface is a network interface.

18. The transaction request provider of claim 15, wherein the processing element is configured to compare the time-related information corresponding to the at least one transaction with a second criterion to decide whether to suspend the transmission of requests to the transaction processing component.

19. The transaction request provider of claim 18, wherein the processing element is configured to resume the transmission of requests to the transaction processing component after it has received an acknowledgement that the at least one transaction has been processed.

20. The transaction request provider of claim 15, further comprising the transaction processing component, and wherein the fair sharing scheme comprises accepting no more than one transaction from each potential requester before accepting a second transaction from any one requester.

* * * * *